(12) United States Patent
Laurent et al.

(10) Patent No.: US 12,288,004 B2
(45) Date of Patent: Apr. 29, 2025

(54) METHOD FOR PROCESSING INFORMATION, ELECTRONIC DEVICE, AND CORRESPONDING COMPUTER PROGRAM PRODUCT AND RECORDING MEDIUM

(71) Applicant: ORANGE, Issy-les-Moulineaux (FR)

(72) Inventors: Sonia Laurent, Chatillon (FR); Laetitia Hertault, Chatillon (FR); Cédric Floury, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/255,728

(22) PCT Filed: Nov. 29, 2021

(86) PCT No.: PCT/FR2021/052115
§ 371 (c)(1),
(2) Date: Jun. 2, 2023

(87) PCT Pub. No.: WO2022/117936
PCT Pub. Date: Jun. 9, 2022

(65) Prior Publication Data
US 2024/0004604 A1   Jan. 4, 2024

(30) Foreign Application Priority Data
Dec. 4, 2020   (FR) ...................................... 2012713

(51) Int. Cl.
*G06F 3/14*   (2006.01)
*G06F 3/04842*   (2022.01)

(52) U.S. Cl.
CPC ........ *G06F 3/1454* (2013.01); *G06F 3/04842* (2013.01)

(58) Field of Classification Search
CPC .... G06F 3/1454; G06F 3/04842; G06F 40/30; H04L 12/1827; H04L 51/18; G06Q 10/10; H04W 4/21
See application file for complete search history.

(56) References Cited

U.S. PATENT DOCUMENTS 11,238,656 B1 *   2/2022   Lin ....................... G06T 19/006
2016/0203415 A1 *   7/2016   Chaiyochlarb ..... G06F 3/04817
706/11

(Continued)

OTHER PUBLICATIONS

English translation of the Written Opinion of the International Searching Authority dated Mar. 23, 2022 for corresponding International Application No. PCT/FR2021/052115, filed Nov. 29, 2021.

(Continued)

*Primary Examiner* — Cao H Nguyen
(74) *Attorney, Agent, or Firm* — David D. Brush; Westman, Champlin & Koehler, P.A.

(57) ABSTRACT

A method implemented in an electronic device, the electronic device and a corresponding computer program product and medium. The method includes: at least partial playback, on a user interface of the electronic device, of items obtained from computing applications and associated with at least a first class of a plurality of item classes; acquiring at least a first command to be executed, wherein the first command relates to at least one of the items that has been at least partially played back.

20 Claims, 3 Drawing Sheets

(56) References Cited

U.S. PATENT DOCUMENTS

Figure 1:
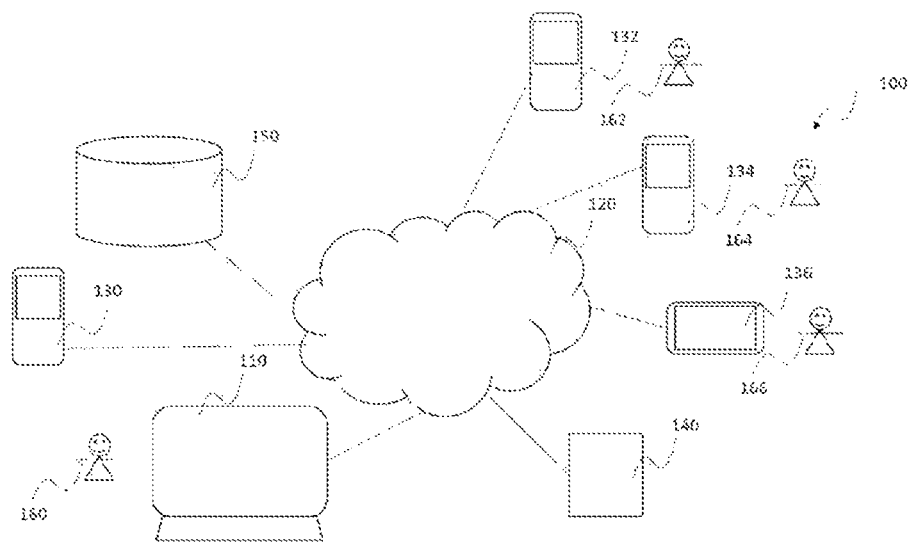

2020/0012423 A1* 1/2020 Cinek ................. H04W 68/005
2022/0092119 A1* 3/2022 Devenny .............. G06Q 10/109

OTHER PUBLICATIONS

International Search Report dated Mar. 23, 2022 for corresponding International Application No. PCT/FR2021/052115, filed Nov. 29, 2021.
Written Opinion of the International Searching Authority dated Mar. 23, 2022 for corresponding International Application No. PCT/FR2021/052115, filed Nov. 29, 2021.

* cited by examiner

METHOD FOR PROCESSING INFORMATION, ELECTRONIC DEVICE, AND CORRESPONDING COMPUTER PROGRAM PRODUCT AND RECORDING MEDIUM

CROSS-REFERENCE TO RELATED APPLICATIONS

This Application is a Section 371 National Stage Application of International Application No. PCT/FR2021/052115, filed Nov. 29, 2021, which is incorporated by reference in its entirety and published as WO 2022/117936 A1 on Jun. 9, 2022, not in English.

1. TECHNICAL FIELD

The present application relates to the field of collaborative exchanges between a plurality of terminals, for example in the context of a use of heterogeneous tools by said terminals. It especially relates to a method for processing information provided by at least one computer application and suitable for being played, at least partially, on a user interface of an electronic device, and to a corresponding electronic device, computer program product and storage medium.

2. PRIOR ART

Many communication tools allow exchanges between users of (fixed and/or mobile) communication terminals such as personal computers, tablets, and connected objects.

These exchanges may be synchronous or asynchronous according to the circumstances, and take multiple forms such as text, audio and/or video.

A given event between a plurality of users of communication terminals may implement a plurality of tools, which may differ depending on the users of the terminals or over time and may themselves be more or less complex. For example, in the context of a videoconference, exchanges by electronic messaging (email) or by so-called "instant" messaging (chat) may take place before or after the videoconference has been held.

The rise of remote working, and more generally of remote communications, and the proliferation and heterogeneity of these communication tools are increasingly confronting users with information overload (sometimes referred to as "infobesity"). Thus, users are receiving more and more information of greater or lesser importance, which may sometimes be forgotten, or not processed (or with delay) by certain users. The object of the present patent application is to propose improvements to at least certain of the drawbacks of the prior art.

3. SUMMARY OF THE INVENTION

The present patent application aims to improve the situation using a method implemented at least partially in an electronic device and comprising:
- an at least partial rendering, on a user interface of said electronic device, of items obtained from computer applications and associated with at least a first class of a plurality of classes of items;
- an acquisition of at least a first command to be executed concerning at least one of said at least partially rendered items.

For example, the present patent application especially relates to a method implemented in an electronic device, comprising:
- a selection, from among a plurality of classes of items, of at least a first class of items to be rendered;
- an at least partial rendering, on a user interface of said electronic device, of items obtained from a plurality of computer applications, said rendering taking into account whether said obtained items belong to said first class of items;
- an acquisition of at least a first command to be executed concerning at least one of said at least partially rendered items.

In certain embodiments, said selection takes account of parameterization data, and/or user-profile data, of at least one storage zone accessible to said device and/or of data obtained via at least one user interface of said device.

In at least one embodiment, said items are obtained by extraction from elements output from said applications.

In at least one embodiment, at least one of said computer applications runs at least partially on said communication device.

In at least one embodiment, the method comprises obtainment of said plurality of classes by implementing an artificial-intelligence technique.

In at least one embodiment, said acquisition of at least a first command comprises a selection of said at least one item concerned by said first command.

In at least one embodiment, said first command comprises an action relating to the rendering of said at least one item.

In at least one embodiment, said first command comprises an action to be performed on said at least one concerned item and/or a second command to be transmitted to at least one application accessible from said electronic device.

In at least one embodiment, the method comprises an update of said rendering after an execution of said first command.

In at least one embodiment, one of said elements and/or said at least one complementary element is a textual, audio, image and/or video element.

Features that are presented separately in the present patent application, in connection with certain embodiments of the method of the present patent application, may be combined together into other embodiments of the present method.

According to another aspect, the present patent application also relates to an electronic device suitable for implementing the method of the present patent application in any one of its embodiments.

For example, the present patent application thus relates to an electronic device comprising at least one processor configured to carry out:
- an at least partial rendering, on a user interface of said electronic device, of items obtained from computer applications and associated with at least a first class of a plurality of classes of items;
- an acquisition of at least a first command to be executed concerning at least one of said at least partially rendered items.

The present patent application especially relates to an electronic device comprising at least one processor configured to carry out:
- a selection, from among a plurality of classes of items, of at least a first class of items to be rendered;
- an at least partial rendering, on a user interface of said electronic device, of items obtained from a plurality of computer applications, said rendering taking into account whether said obtained items belong to said first class of items;

an acquisition of at least a first command to be executed concerning at least one of said at least partially rendered items.

The present patent application also relates to a computer program comprising instructions for implementing the various embodiments of the above method, when the program is executed by a processor, and to a storage medium readable by an electronic device and on which the computer program is stored.

For example, the present patent application thus relates to computer program comprising instructions for implementing, when the program is executed by a processor of an electronic device, a method comprising:

an at least partial rendering, on a user interface of said electronic device, of items obtained from computer applications and associated with at least a first class of a plurality of classes of items;

an acquisition of at least a first command to be executed concerning at least one of said at least partially rendered items.

For example, the present patent application relates to a computer program comprising instructions for implementing, when the program is executed by a processor of an electronic device, a method comprising:

a selection, from among a plurality of classes of items, of at least a first class of items to be rendered;

an at least partial rendering, on a user interface of said electronic device, of items obtained from a plurality of computer applications, said rendering taking into account whether said obtained items belong to said first class of items;

an acquisition of at least a first command to be executed concerning at least one of said at least partially rendered items.

For example, the present patent application also relates to a storage medium readable by a processor of an electronic device and on which is stored a computer program comprising instructions for implementing, when the program is executed by the processor, of a method comprising:

an at least partial rendering, on a user interface of said electronic device, of items obtained from computer applications and associated with at least a first class of a plurality of classes of items;

an acquisition of at least a first command to be executed concerning at least one of said at least partially rendered items.

For example, the present patent application relates to a storage medium readable by a processor of an electronic device and on which is stored a computer program comprising instructions for implementing, when the program is executed by the processor, of a method comprising:

a selection, from among a plurality of classes of items, of at least a first class of items to be rendered;

an at least partial rendering, on a user interface of said electronic device, of items obtained from a plurality of computer applications, said rendering taking into account whether said obtained items belong to said first class of items;

an acquisition of at least a first command to be executed concerning at least one of said at least partially rendered items.

The aforementioned programs may use any programming language, and take the form of source code, object code, or of code intermediate between source code and object code, such as code in a partially compiled form, or in any other desirable form.

The aforementioned data media may be any entity or device capable of storing the program. For example, a medium may include a storage means, such as a ROM, for example a CD-ROM or a microelectronic circuit ROM, or else a magnetic storage means.

Such a storage means may be for example a hard disk, a flash memory, etc.

Moreover, a data medium may be a transmissible medium such as an electrical or optical signal, which may be routed via an electrical or optical cable, by radio or by other means. A program according to the invention may in particular be downloaded from a network such as the Internet.

Alternatively, a data medium may be an integrated circuit into which a program is incorporated, the circuit being suitable for executing or being used in the execution of any one of the embodiments of the method forming one subject of the present patent application.

4. BRIEF DESCRIPTION OF THE DRAWINGS

Figure 2:
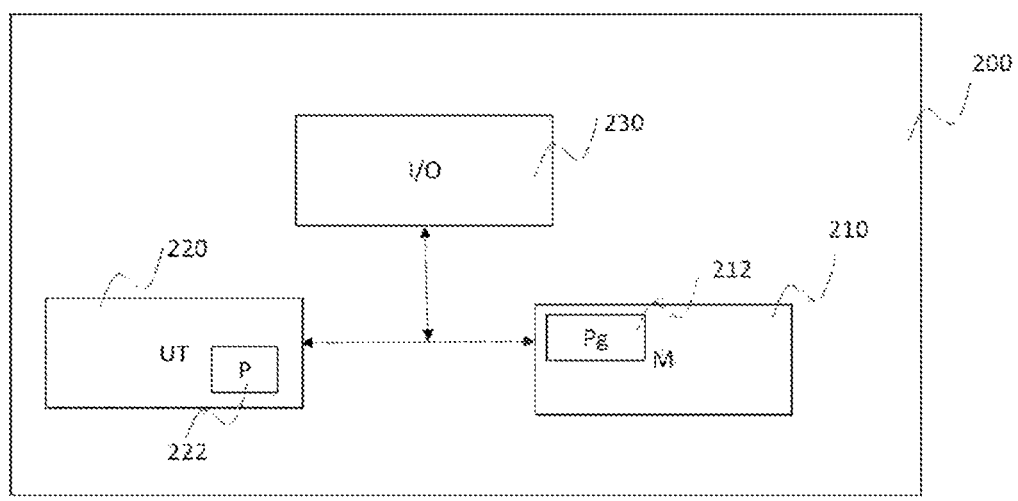
Figure 3:
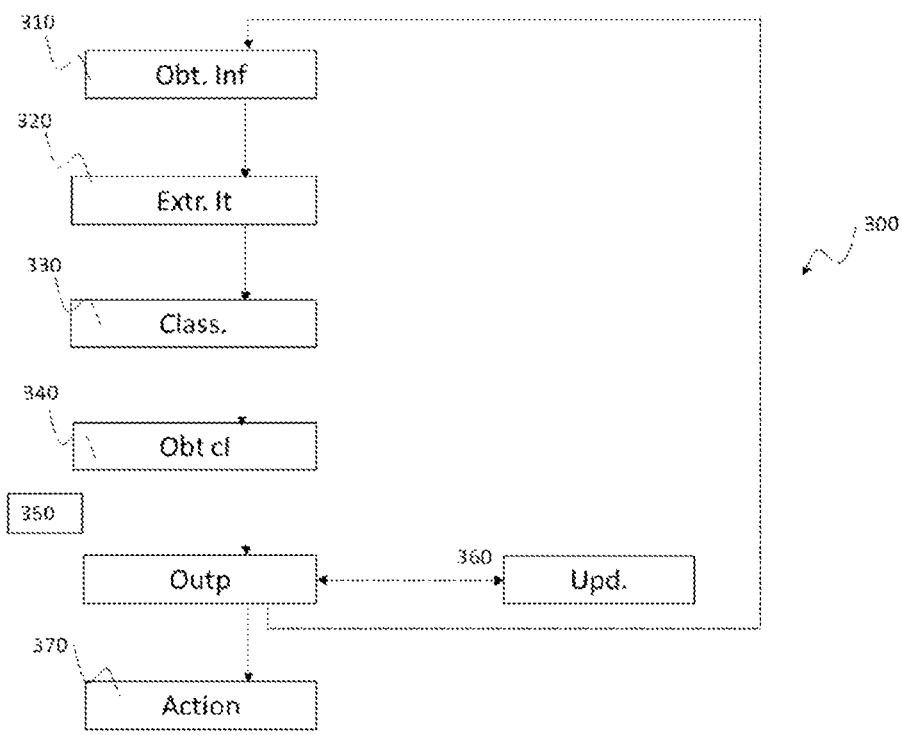
Figure 4:
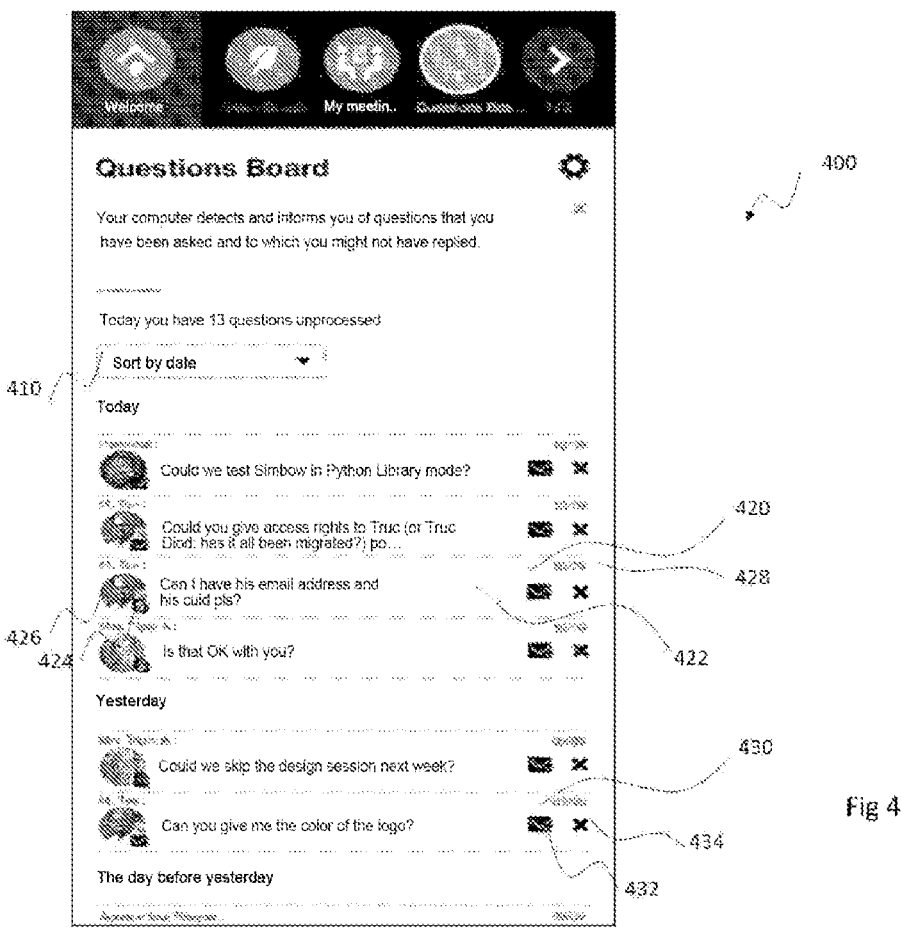

Other features and advantages of the invention will become more clearly apparent on reading the following description of particular embodiments, which are provided by way of simple illustrative and non-limiting examples, and of the appended drawings, in which:

FIG. 1 presents a simplified view of a system, cited by way of example, in which at least certain embodiments of the method of the present patent application may be implemented, FIG. 2 presents a simplified view of a device suitable for implementing at least certain embodiments of the method of the present patent application, FIG. 3 presents an overview of the processing method of the present patent application, in certain of its embodiments, FIG. 4 presents one example of a user interface of an electronic device implementing at least certain embodiments of the method of the present patent application.

5. DESCRIPTION OF THE EMBODIMENTS

The present patent application aims to help a user (or a group of users) of at least one electronic device, such as a communication terminal, to process a stream of information, by identifying in this information items that appear to be of importance (referred to here as "significant") and by grouping these items together for delivery to the user, and thus facilitate processing thereof. Specifically, a rendering in grouped form of the items may facilitate their subsequent exploitation by a user and/or the monitoring (for example over time) of these items.

By significant item, or item to be highlighted, what is meant is information (a word, group of words, image, audio and/or video sequence for example) identified as potentially having a certain importance (i.e. potentially being of interest) to a user and with which processing must probably be associated. It may for example be the statement of a problem to be dealt with, of a question to be answered, of important information to be memorized, and/or of a task to be carried out.

The items may originate from information received from various applications, whether local to a terminal or implementing a plurality of communication devices (such as communication tools like electronic messaging tools, for example instant messaging tools, and/or tools linked to public or private social networks).

By application, what is meant here is a computer application (or tool) especially comprising a software component.

In this way, the present patent application may for example help a user (such as an organizer of a meeting) confronted with a large amount of information not to forget to answer certain questions or to remember the context of a question (e.g. where, when, by whom, and/or on what occasion the question was asked). Specifically, buried in the mass and diversity of applications, certain information could be forgotten and not processed by the user.

Grouping together (or aggregating) items in this way may especially result in collation of items originating from information obtained from various applications and for example having a "semantic" link. Such grouping may help a user to obtain an "overview" of a group of items, independently of the applications from which they were (directly or indirectly) obtained, and therefore promote processing of the items by theme rather than by origin, this potentially helping a user to increase productivity.

Certain embodiments may also help a user to follow up on these items, in particular those that he or she has not yet processed, and allow him or her to perform one or more actions in relation to their processing.

Thus, by helping users to process streams of information, the method of the present patent application may, for example, when it is implemented in a professional context, help businesses to improve the well-being and productivity of their staff. The present patent application will now be described in more detail with reference to FIG. 1.

FIG. 1 shows a telecommunication system 100 in which certain embodiments of the invention may be implemented. The system 100 comprises one or more electronic devices, at least certain of which are able to communicate with one another via one or more, optionally interconnected, communication networks 120, such as a LAN (Local Area Network, 1) and/or a WAN (Wide Area Network, 2). For example, the network may comprise a corporate or domestic LAN and/or an internet WAN or cellular WAN, GSM—Global System for Mobile Communications, UMTS—Universal Mobile Telecommunications System, Wi-Fi—Wireless, etc.

As illustrated in FIG. 1, the system 100 may also comprise a plurality of electronic devices, such as a terminal (such as a laptop computer 110, a smartphone 130, 132, 134, a tablet 136), and/or a server 140, for example an application server, and a storage device 150. The system may also comprise network management and/or interconnection elements (not shown). These electronic devices may be associated with at least one user 160, 162, 164, 166 (for example through a user account accessible by login), certain of the electronic devices 110, 130 possibly being associated with the same user 160.

FIG. 2 illustrates a simplified structure of an electronic device 200 of the system 100, for example the device 100, 130, 136 or 140 of FIG. 1, suitable for implementing the principles of the present patent application. Depending on the embodiment, it may be a server, and/or a terminal.

The device 200 especially comprises at least one memory M 210. The device 200 may especially comprise a buffer memory, a volatile memory, for example a RAM (Random Access Memory), and/or a non-volatile memory, a ROM (Read-Only Memory) for example. The device 200 may also comprise a processing unit UT 220, equipped for example with at least one processor P 222, and controlled by a computer program PG 212 stored in the memory M 210. On initialization, the code instructions of the computer program PG are for example loaded into a RAM memory before being executed by the processor P. Said at least one processor P 222 of the processing unit UT 220 may especially implement, individually or collectively, any one of the embodiments of the method of the present patent application (especially as described with reference to FIG. 3), according to the instructions of the computer program PG.

The device may also comprise, or be coupled to, at least one I/O (input/output) module 230, such as a communication module, for example allowing the device 200 to communicate with other devices of the system 100, via wired or wireless communication interfaces, and/or such as a module for interfacing with a user of the device, also more simply referred to as the "user interface" in this patent application. By user interface of the device, what is meant for example is an interface integrated into the device 200, or part of a third-party device coupled to this device by wired or wireless communication means. For example, it may be a question of a secondary screen of the device or of a set of loudspeakers connected by wireless technology to the device.

A user interface may in particular be what is referred to as an "output" user interface, suitable for rendition (or controlling a rendition) of an output element of a computer application used by the device 200, for example an application running at least partially on the device 200 or an "online" application running at least partially remotely, for example on the server 140 of the system 100. Examples of an output user interface of the device include one or more screens, especially at least one graphics screen (a touchscreen for example), one or more loudspeakers, and a connected headset. The interface of the device 200 may for example be suitable for rendition of the dashboard illustrated in FIG. 4.

By rendition, what is meant here is a rendering on (or output to) at least one user interface, in any form, for example comprising textual, audio and/or video components, or a combination of such components.

Moreover, a user interface may be what is referred to as an "input" user interface, suitable for acquiring a command from a user of the device 200. It may especially be a command corresponding to an action to be performed in connection with a rendered item, and/or a command to be transmitted to a computer application used by the device 200, for example an application running at least partially on the device 200 or an "online" application running at least partially remotely, for example on the server 140 of the system 100. Examples of an input user interface of the device 200 include a sensor, a means for acquiring audio and/or video (microphone, camera (webcam) for example), a keyboard, and a mouse.

Said at least one microprocessor of the device 200 may especially be suitable for carrying out:
- an at least partial rendering, on a user interface of said electronic device, of items obtained from computer applications and associated with at least a first class of a plurality of classes of items;
- an acquisition of at least a first command to be executed concerning at least one of said at least partially rendered items.

For example, said at least one microprocessor of the device 200 may especially be suitable for carrying out:
- a selection, from among a plurality of classes of items, of at least a first class of items to be rendered;
- an at least partial rendering (350), on a user interface of said electronic device, of items obtained from a plurality of computer applications, said rendering taking into account whether said obtained items belong to said first class of items;

an acquisition (370) of at least a first command to be executed concerning at least one of said at least partially rendered items.

Certain of the above input-output modules are optional and may therefore be absent from the device 200 in certain embodiments. In particular, although the present patent application is sometimes detailed with reference to a device communicating with at least a second device of the system 100, the method may also be implemented locally by a device, for example using output elements of applications requiring no exchanges between devices (such as an electronic calendar for example).

In contrast, in certain of its embodiments, the method may be implemented in a manner distributed between at least two devices 110, 130, 132, 134, 136, 140 and/or 150 of the system 100.

By the term "module" or the term "component" or "element" of the device, what is meant here is a hardware element, especially a wired hardware element, or a software element, or a combination of at least one hardware element and of at least one software element. The method according to the invention may therefore be implemented in various ways, especially in wired form and/or in software form. FIG. 3 illustrates certain embodiments of the method 300 of the present patent application. The method 300 may for example be implemented by the electronic device 200 illustrated in FIG. 2.

As illustrated in FIG. 3, the method 300 may comprise obtainment 310 of output items related to one or more applications. It may especially be a heterogeneous plurality of applications. The applications may be various, depending on the embodiment of the present patent application and especially depending on the activities of a user of the device 200. For example, it may be an electronic messaging application, an instant messaging application for example, of an online application, accessible from a WEB portal, of an application for acquiring or rendering text, audio and/or video, or of a collaborative tool. The collaborative tool may for example allow exchanges between users, via a messaging interface, and/or offer possibilities in respect of voice or video calls, of videoconferencing, of sharing multimedia documents (text, audio and/or video, internet link, etc.), of archiving of exchanges, etc.

The obtainment 310 of output elements may for example comprise reception on a communication interface of at least certain of these elements and/or read access to a, local or remote, storage zone storing these elements (for example a database (as illustrated by element 150 of FIG. 1), such as a database common to a plurality of users or dedicated to one or more activities).

An output element may for example comprise a functional element, resulting from the implementation of the functionalities of the application (for example a relatively long text generated by a word-processing application or online messaging application) and/or data associated with this functional element. The data associated with this functional element may for example include an identifier of the application that produced (or provided) the functional element and/or an identifier of the functional element in a storage zone storing this functional element, or even other data presented in more detail with the detailed rendering step below.

In the embodiment of FIG. 3, the method may also comprise an extraction 320 of significant items from the obtained output elements. From an output element of an application may be extracted zero, one or more than one significant items.

The extraction 320 of such significant items may for example be based on STT conversion algorithms (SST standing for Speech To Text), on TTS conversion algorithms (TTS standing for Text To Speech), or on artificial-intelligence techniques, such as NLU processing techniques (NLU standing for Natural Language Understanding). In particular, a user context (for example his or her professional activities) may be taken into account.

For example, an exchange by instant messaging of polite phrases, or "banalities" (such as "Hello", How are you?), with little semantic content, may not give rise to a significant item, while an exchange richer in meaning ("Our client XX did not receive their delivery this morning. Could you call them please? Oh, by the way, could you provide me with a forecast of the team's holidays for Christmas?") could give rise to one or more significant items.

In the example illustrated, the method may further comprise an association 330 of at least one of the extracted significant items with at least one class (or category) of significant items. This association (or classification) may for example use artificial-intelligence techniques, such as NLU processing techniques (NLU standing for Natural Language Understanding) and/or neural-network-based classification techniques. In certain embodiments, these techniques may make it possible to obtain at least one set of hierarchical classes (in various classification models a class for example comprises a plurality of subclasses, or a given class is able to be attached to one or more "parent" classes). The candidate classes for an association may for example correspond to the classes used to train a neural network used during the association.

In certain embodiments, the method may comprise a rendition (or rendering) 350 of at least some of the extracted significant items on at least one output user interface of the electronic device. The rendering environment of the user interface may be more or less complex. It may for example comprise a rendition space dedicated to aggregations of items (sometimes referred to as the highlight dashboard in this patent application).

FIG. 4 illustrates one example of rendering (or rendition) of significant items. In this illustration, the rendering takes visual form, in at least one rendition window. Of course, other types of rendering may be used in other embodiments.

The significant items may be grouped together (or in other words aggregated) according to one or more grouping criteria. Thus, one grouping criterion may be a criterion of belonging to one or more classes. The rendition may also be limited to the rendering of significant items associated with certain classes. Thus, in certain embodiments, the classes of items to be rendered may be selected depending on parameterization data, and/or on a user profile, which is/are for example stored in a storage zone accessible to the device 200, or on data obtained 340 via a user interface. In the example of FIG. 4, only items relating to questions to which an answer has not been provided (by the user of the device for example) are rendered. The total number of significant items rendered, like the number of significant items rendered for a given class, may vary depending on the embodiment. Likewise, the number and choice of the classes rendered may vary depending on the embodiment. For example, it may be a rendition of a constant total number of significant items, of a rendition of the significant items of a constant number of classes, or even of a rendition of a fixed percentage of extracted significant items or of a rendition of significant items of a fixed percentage of the total number of classes.

In certain embodiments, the number of items rendered and/or the group(s) of items rendered may take into account the type of rendition (visual, audio, etc.), the user interface of the rendering (the size of a rendition screen for example), a priority assigned to at least one class of significant items (depending on a criterion of relevance to a user for example), or rules defined in at least one configuration file or via a user interface, for example allowing a selection of significant items to be rendered depending on one or more classes associated with them.

Within a given class, the order of aggregation of the significant items may vary depending on the embodiment. For example, the order of aggregation of the significant items may take into account their chronology and/or their semantics. In the example of FIG. 4, a dedicated interface 410 thus allows acquisition of a criterion determining order within a group. Thus, account may be taken, for example, of a chronology of generation of the output elements from which the items were extracted by the corresponding applications (as illustrated in FIG. 4), or of a latest date at which an item must be processed (so as to render items requiring urgent action on the part of the user first). Account may also be taken of whether items of a rendered class belong to other classes (items belonging to a given class being grouped together) or of whether they originate from the same application.

FIG. 4 illustrates a rendering of a dashboard 400 comprising a zone 420 for rendition of an item, in which zone the rendition of at least a part 422 of an item (here a textual item) may be accompanied by a rendition of additional data, such as at least one identifier 424 of the application (for example Skype©) from which the item originated and/or at least one identifier 426 of a user (person or group of people) of the application from which the item originated and/or a date and/or time 428 of generation (creation and/or modification) of the output elements from which the items were extracted.

As illustrated in FIG. 4, items originating from a plurality of interlocutors and/or from a plurality of applications may be grouped together.

In the embodiment illustrated in FIG. 3, the method may also comprise an, optional, step of modification 360 of at least one aggregation during rendering. For example, the modification 360 may comprise addition of at least one significant item. This item is then associated with the class of items of this aggregation. A user may thus add, to the aggregation, an item that would not have been extracted from an output element in the extraction step. It may also be a question of an item added freely by a user having at least partial access to at least one class of items (for example during the at least partial rendering of a class of items). By way of example, an "Add" function may allow the user to add an item to the rendered significant items.

Additional information may also be added by way of complement to this item (such as an identifier of the user who made the addition, a date and/or time of addition of the item, a note of the "free" addition, a classification, a reason for the addition etc.) (example: Addition (By: Didier Dupont; On: 4 Dec. 2020 at 11.15; Text: Request entry of my time spent. Channel free addition not via an application; How: via informal exchange). Conversely, a significant item may be deleted from the rendering (for example because it is considered irrelevant) or its classification may be modified.

The method may also comprise an, optional, step of acquisition of feedback on a current or past rendering. This feedback may take the form of an evaluation (a rating for example) of the relevance of the significant items rendered. It may also take the form of creation of a new class (or category) of one or more significant items, and its association with at least one rendered significant item (for example a significant item added in the optional modification step described above).

The modifications made to the rendering, such as any acquired feedback, may be used to modify the rules of extraction and/or classification of the significant items. More precisely, in certain embodiments, the occurrence of modifications and/or the acquisition of feedback may trigger an update of a model used for the extraction or classification. It may for example be a fine-tuning of the learned model by training it using the obtained feedback data as training data. Such fine-tuning may help to correct errors in the model or to obtain a model that is better suited to the expectations of a user, or to a change in the applications that he or she is using.

As in FIG. 3, the method may also comprise a modification 360 (before or during the rendition 350) of at least one of the rendered items, especially in order to make it more understandable or more concise. For example, a text sequence may be modified slightly to increase its clarity, or replaced by a shorter sequence of same semantics. A voice sequence may be replaced by a voice sequence of equivalent semantics but with a less pronounced accent or a slower rhythm. To increase access speed or save memory, an image may also be replaced by a segment of this image.

As in FIG. 3, the method further comprises an, optional, step 370 of acquisition of a command associated with at least one of the rendered items. It may for example be at least one action to be performed on an item, on its rendition and/or on the output element from which it originated (for example deletion or archiving of an item or of the output element from which it originated).

It may for example be at least one command, associated with this item, to be transmitted to an application (for example a command to generate a voice and/or text message for delivery to another device or to a user from a third-party terminal, with a view to having the item and/or the output element from which it originated transmitted, or it to be commented on (for example, to provide an answer to a question)). Thus, a command will possibly require items representative of tasks to be performed to be deleted once they have been completed.

The application to which a command associated with an item is transmitted may correspond to the application from which the item originated or indeed be a different application. Thus, an item from a text-messaging application may be answered via voice message. Other examples of commands may include adding an event to a calendar, especially an electronic calendar, setting a reminder concerning an action to be performed later, scheduling an appointment or a meeting. An item and the action performed on this item may also be used to enrich a document (multimedia file, minutes of a meeting, report, etc.).

A command may concern a single item among the rendered items or a command may concern a plurality of items. Specifically, grouped processing of items may promote faster and/or more consistent processing of certain items. To this end, the user interface may comprise interface elements suitable for acquisition of a selection of the one or more items concerned by a command.

Such interface elements may for example comprise means of explicit or implicit designation of at least one rendered item. For example, these designation means may allow a selection of a plurality of rendered items of a class (for example all the rendered items of the class, or only certain of the rendered items of the class); certain items may also be explicitly or implicitly excluded. Specifically, implicit designation of certain items may help with faster acquisition of the command.

In certain embodiments, as illustrated in FIG. 4, the actions that may be performed on an item 430 may be indicated by at least one interface element 432, 434 that is potentially operable by a user (for example via click).

The acquisition of a command may comprise acquisition of at least one parameter necessary for an action associated with the command (for example an access path to a file where one or more items may be archived, or elements allowing an automatic message to be generated (such as a designation of one or more recipients of a reply message, a voice or text message to be transmitted, etc.)).

The method detailed above may also be applied to elements provided by various applications. Thus, according to a first example of implementation, a user may receive, via an electronic messaging application, a document viewable via a text-editing application, such as a document in PDF format or a Word© document. It may thus be the minutes of a meeting for example. When the user opens the document via the text-editing application, the content of the document may be read, by an API of the text editor for example, and significant items may then be extracted from this content, then classified.

Thus, according to a second example of implementation, an analysis of the content of an electronic message, or of a post on a social network (for example a corporate social network such as the tool Jive©), for example a redirection via a post of an electronic message, may make it possible to extract significant items associated with various classes therefrom.

The invention claimed is:

1. A method implemented in an electronic device, comprising:
   selecting, from among a plurality of classes of items, at least a first class of items to be rendered;
   performing an at least partial rendering, on a user interface of said electronic device, of several items obtained by extraction from elements output from a plurality of computer applications, said rendering taking into account whether said obtained several items belong to said first class of items and;
   acquiring at least a first command to be executed, said at least one first command concerning at least two of said at least partially rendered several items.

2. The method as claimed in claim 1, wherein said selecting takes account of parameterization and/or user-profile data of at least one storage zone accessible to said device and/or of data obtained via at least one user interface of said device.

3. The method as claimed in claim 1, wherein at least one of said computer applications runs at least partially on said device.

4. The method as claimed in claim 1 comprising carrying out a classification of said several items depending on said plurality of classes using an artificial-intelligence technique.

5. The method as claimed in claim 1, wherein said acquiring at least a first command comprises selecting said at least two items concerned by said first command.

6. The method as claimed in claim 1, wherein said first command comprises an action relating to the rendering of said at least two items.

7. The method as claimed in claim 1, wherein said first command comprises an action to be performed on said at least two concerned items and/or a second command to be transmitted to at least one application accessible from said electronic device.

8. The method as claimed in claim 1 comprising carrying out an update of said rendering after an execution of said first command.

9. The method as claimed in claim 1, wherein at least one of said several items and/or at least one complement to said several items is a textual, audio, image and/or video element.

10. The method as claimed in claim 1 wherein said extraction takes into account semantics of the elements output from the plurality of computer applications.

11. The method as claimed in claim 1 comprising obtaining said plurality of classes is using an artificial-intelligence technique.

12. A non-transitory storage medium readable by at least one processor of an electronic device and on which is stored a computer program comprising instructions for implementing, when the computer program is executed by said at least one processor, a method comprising:
   selecting, from among a plurality of classes of items, at least a first class of items to be rendered;
   performing an at least partial rendering, on a user interface of said electronic device, of several items obtained by extraction from elements output from a plurality of computer applications, said rendering taking into account whether said obtained several items belong to said first class of items; and
   acquiring at least a first command to be executed, said at least one first command concerning at least two of said at least partially rendered several items.

13. An electronic device comprising:
   at least one processor configured to carry out:
   a selection, from among a plurality of classes of items, of at least a first class of items to be rendered;
   an at least partial rendering, on a user interface of said electronic device, of several items obtained by extraction from elements output from a plurality of computer applications, said rendering taking into account whether said obtained several items belong to said first class of items; and
   an acquisition of at least a first command to be executed, said at least one first command concerning at least two of said at least partially rendered items.

14. The electronic device of claim 13, said selecting taking account of parameterization and/or user-profile data of at least one storage zone accessible to said device and/or of data obtained via at least one user interface of said device.

15. The electronic device of claim 13, said extraction taking into account semantics of the elements output from the plurality of computer applications.

16. The electronic device of claim 13, said at least one processor being configured to carry out a classification of said items depending on said plurality of classes using an artificial-intelligence technique.

17. The electronic device of claim 13, said plurality of classes being obtained using an artificial-intelligence technique.

18. The electronic device of claim 13, said first command comprising an action relating to the rendering of said at least two items.

19. The electronic device of claim 13, said first command comprising an action to be performed on said at least two concerned items and/or a second command to be transmitted to at least one application accessible from said electronic device.

20. The electronic device of claim 13, said at least one processor being configured to carry out an update of said rendering after an execution of said first command.

* * * * *